United States Patent
Bobeck et al.

(10) Patent No.: US 8,912,466 B2
(45) Date of Patent: Dec. 16, 2014

(54) ELECTRODE MANAGEMENT DEVICE FOR ELECTRICAL DISCHARGE MACHINING MACHINE TOOLS

(75) Inventors: Magnus Bobeck, Vimmerby (SE);
Olivier Bruyere, Naves Parmelan (FR);
Christian Chapatte, Petit-Lancy (CH);
Jens Thing, Ipsach (CH)

(73) Assignees: AGIE Charmilles SA, Losone (CH);
Agie Charmilles New Technologies S.A., Meyrin (CH)

( * ) Notice: Subject to any disclaimer, the term of this patent is extended or adjusted under 35 U.S.C. 154(b) by 545 days.

(21) Appl. No.: 13/033,149

(22) Filed: Feb. 23, 2011

(65) Prior Publication Data
US 2011/0226741 A1 Sep. 22, 2011

(30) Foreign Application Priority Data
Feb. 26, 2010 (EP) ..................................... 10154809

(51) Int. Cl.
*H05B 3/00* (2006.01)
*B23Q 3/157* (2006.01)
*B23H 7/26* (2006.01)

(52) U.S. Cl.
CPC ........................................ *B23H 7/26* (2013.01)
USPC ............................................ 219/138; 483/18

(58) Field of Classification Search
USPC ............. 219/68, 69.1, 69.11–69.19, 69.2, 50, 219/138–144; 483/16–18, 48, 58; 403/361, 403/364, 335; 409/233
See application file for complete search history.

(56) References Cited

U.S. PATENT DOCUMENTS

| | | | |
|---|---|---|---|
| 4,713,515 A * | 12/1987 | Choi | 219/69.15 |
| 4,815,780 A | 3/1989 | Obrist | |
| 4,845,835 A * | 7/1989 | Schneider | 483/49 |
| 4,855,558 A | 8/1989 | Ramsbro | |
| 4,910,860 A * | 3/1990 | Winkler et al. | 483/31 |
| 4,996,762 A * | 3/1991 | Takayama | 483/49 |
| 5,634,757 A | 6/1997 | Schanz | |
| 6,228,008 B1 * | 5/2001 | Pollington et al. | 483/67 |
| 6,609,851 B2 * | 8/2003 | Nordquist et al. | 403/279 |
| 7,002,111 B2 * | 2/2006 | Bauer | 219/480 |
| 8,308,169 B2 * | 11/2012 | Dahlquist | 279/126 |
| 2003/0222075 A1 * | 12/2003 | Binet et al. | 219/430 |
| 2006/0213205 A1 * | 9/2006 | Reverendo | 62/3.3 |
| 2012/0061376 A1 * | 3/2012 | McBean et al. | 219/430 |

FOREIGN PATENT DOCUMENTS

| | | |
|---|---|---|
| EP | 0255042 | 2/1988 |
| EP | 0285557 | 10/1988 |
| EP | 0997220 | 5/2000 |
| WO | 9933601 | 7/1999 |

* cited by examiner

*Primary Examiner* — Henry Yuen
*Assistant Examiner* — Michael LaFlame, Jr.
(74) *Attorney, Agent, or Firm* — Bachman & LaPointe, P.C.

(57) ABSTRACT

Device for managing the electrodes for electrical discharge machining EDM machine tools comprises at least one magazine (1) that has a series of individual housings (33) designed to accept and hold exchangeable elements (5) consisting of electrodes (6, 22) mounted on an electrode holder (11a, 11b), and a changer device (2) equipped with a gripper (2) intended to move the exchangeable elements (5) from the individual housings (33) towards the machine and vice versa. A first adapter piece (21) is associated with each of the exchangeable elements (5). This adapter piece (21) surrounds the electrode holder (11a, 11b) and is gripped around its periphery by the gripper (9) of the changer (2) so as to guarantee that the exchangeable element (5) is held precisely. The device further comprises a second adapter piece (32) associated with each of the individual housings (33) of the magazine (1) that are likely to be used.

21 Claims, 10 Drawing Sheets

ELECTRODE MANAGEMENT DEVICE FOR ELECTRICAL DISCHARGE MACHINING MACHINE TOOLS

BACKGROUND OF THE INVENTION

The present invention relates to a device for managing the electrodes for electrical discharge machining (EDM) machine tools. These machines use tool electrodes intended to machine workpiece electrodes. The device comprises at least one magazine or rack that has a series of individual housings designed to accept and hold exchangeable elements consisting of the said electrodes each mounted on an electrode holder. The device comprises at least one changer equipped with at least one gripping member intended to move the exchangeable elements between the said individual housings and an attachment system situated on the machine, and vice versa.

Such devices, which are widespread in EDM, are generally equipped with a linear magazine (rack) or magazine in the form of a carousel, in which the exchangeable elements are locked in the individual housings; a manipulator arm transports the exchangeable elements between the magazine and an attachment system generally consisting of a chuck connected either to the head or to the table of the EDM machine; a numerical control system controls the movements, the stoppings in reference positions and synchronizes the lockings/unlockings on the arm, the head or the table. There are a number of possible movements depending on a particular sequence and for example:

the arm moves into a precise position situated under the magazine so that the exchangeable element is unlocked from its grip in the magazine and locked onto the arm, the arm moves into a reference position facing the head so that the exchangeable element is unlocked and locked onto the arm, the machining head performs a movement to release the exchangeable element locked onto the arm, the arm performs a movement to release the exchangeable element locked to the head, etc., in certain relatively slow devices it is the machining head which performs the movements needed for transferring the exchangeable elements, in other, more high-speed devices, a pivoting arm manipulates two exchangeable elements simultaneously, one which goes into the head, and the other which returns to the magazine.

The devices for changing elements used commonly on die-sinking electrical discharge machine tools are relatively slow programmable devices, but are compatible with EDM which has admittedly acquired a reputation in the eyes of the public as being a slow process. The need to accelerate the rates of tool change has arisen belatedly because, in most cases, the overall profitability of the machining process is not found to be appreciably affected by tool change speed. Once a reserve of more than ten exchangeable elements becomes necessary, the magazines and changers available for electrical discharge machining become very bulky and can take up as much floor space as a second machine. That is because they have been built to correspond to the standard attachment devices of electrode holders commonly used in EDM, which conventional devices are now in very widespread use with users; these attachment devices require the exchangeable elements to be grasped, stored and locked in a vertical position. In the case of a circular magazine, this requirement dictates a vertical axis of rotation and a substantial diameter, hence a great size. A circular magazine with a horizontal axis would, however, allow a great many exchangeable elements to be stored in a minimum amount of floor space.

The attachment devices in question were developed in particular for electrical discharge machining so as to guarantee precise repositioning of the exchangeable elements particularly in the machining head of the electrical discharge machine. Electrical discharge machining is known for its working environment which is highly contaminated with fumes and particles that have arisen from the cracking of the dielectrics, which particles are liable to adhere to the mechanical interfaces compromising the precision of repositioning operations. That is a significant reason why devices equipped with conical tapers have had to be abandoned because of the excessively large bearing areas that have to come into contact with one another. These special attachment devices are described, inter alia, in the following patent documents: EP 0 255 042, EP 0 285 557, EP 0 997 220, WO 99 33 601, U.S. Pat. No. 5,634,757.

With all manufacturers, they generally comprise a narrow drawbar attached axially to the electrode holder; the device forming the connection between the bar and the electrode holder is preferably designed to allow misalignment between the axes of the bar and of the electrode holder so that the bar does not transmit any torque to the electrode holder. Such a result is achieved for example by means of a toggle joint.

Near to the end of this drawbar, a retaining element in the form of a circular groove collaborates with a locking system consisting of balls and springs situated in the head or the table of the machine. These attachment devices comprise two sets of four surface-ground bearing faces facing one another, one set on the head or the table, and the other set on the electrode holder and which create a plane of contact perpendicular to the axis of the system of attachment to the head or to the table. The bearing faces situated on the head or on the table are each equipped with pneumatic orifice at their centre. A powerful jet of compressed air drives the impurities away at the moment that the opposing bearing faces come to press against one another. In addition, these bearing faces are of small surface area so that the contact pressure is enough to crush any impurity that may have remained adhered thereto. Depending on the manufacturer, a group of four bearing faces on protruding bosses are attached either to the electrode holder or to the machining head, for example.

The drawbar needs to be narrow enough that it can be housed between the four bearing faces and also allow a fork of the changer to be inserted on each side of this same bar without touching the bosses.

These attachment devices further comprise elastic pieces generally in the form of plates which have the special feature of being deformable in the direction of the axis of the machining head, but which offer a great deal of rigidity in the direction perpendicular to that same axis. Alignment elements generally in the form of pins shaped as pyramids made of a very hard material and attached to the machining head are set into these elastic pieces and force the electrode holder to position itself laterally with respect to the machining head 4 of the machine in a precise and repeatable manner. Because the force transmitted by the drawbar to the electrode holder is only an axial force, the positioning of the bearing faces and of the pins are not disturbed by parasitic stresses. The narrow drawbar also comprises in its middle two superposed grooves corresponding to two types of forks: changer forks and magazine forks. The narrow drawbar therefore on the one hand allows the electrode holder to be locked into the bore of the attachment system connected to the head of the machine or to the table and on the other hand allows it to be grasped and manipulated using a simple fork.

A number of suppliers of good repute such as EROWA, SYSTEM 3R or HIRSCHMANN for example, offer accessories to be incorporated into the head or into the table of the machine and ranges of electrode holders dedicated to electrical discharge machining. The principles of attachment, grasping, repositioning and locking used are similar from one supplier to another, although the suppliers are differentiated in terms of constructional details. As a result, users generally choose a single make and equip their entire holding of EDM machines with hardware from one single attachment system supplier, even if they possess electrical discharge machine tools of different makes. As a result, one and the same machine fitted with an attachment system of a given make can no longer accept electrode holders of a different make.

If such electrode holders are loaded symmetrically, kept vertical, suspended by their drawbar and handled at a sufficiently low speed, then this forks system is an acceptable way of holding the said electrode holders in position while they are being transported and stored.

Users of die-sinking electrical discharge machine tools frequently have to produce a great many electrodes of different shapes for machining a single component or a single mould. These electrodes have to be kept available in the rack or magazine throughout the machining process because they may be used several times each in order to produce cavities that are repeated at several points in the workpiece. As a result, because each cavity in isolation takes only a few minutes to machine, the time spent changing the electrode tends to become significant and the user does not feel free to choose the optimum machining sequence, that is to say the order that best suits him for using and reusing the various electrodes available in the magazine.

Further, during preparation for these complex machining sequences involving a great many electrodes, the operator wishes to carry out operations of presetting the electrodes or to perform a "dummy run" before beginning the actual machining operation proper, in order, for example, to eliminate any risk of incorrect positioning of an electrode on his electrode holder or of exchangeable elements being switched in the magazine. The entire exchange sequence is then run with the operator looking on and taking geometric measurements in the work space and checking that his program is running correctly. Each electrode is brought into position facing the cavity it is supposed to machine or into contact with a measuring sensor, but machining is not enabled during these operations. The operator obviously wants the dummy run and setup phase to be over as quickly as possible.

For these reasons a need has recently arisen in the field of electrical discharge machining to have available programmable controllers or management devices which are more rapid for changing the electrode holders. This is why the first thought was to accelerate the movements of the programmable controllers already available. Unfortunately, numerous incidents such as the dropping of exchangeable elements, incorrect gripping in the attachment system on the machine, jamming, collisions, were noted. These incidents were caused by the fact that the forks of the changers take hold of the exchangeable elements via the very narrow drawbar described hereinabove and such attachment unfortunately does not provide sufficient rigidity under these new conditions because of the clearance and the small diameter of the gripping groove around the said drawbar. During the rapid rotary movement of the changer, the electrode holder, weighed down by an electrode which is sometimes heavy and unbalanced, is subjected to dangerous oscillations detrimental to the reliability of the installation.

In spite of these constraints, it would be desirable if a new concept for electrode management were to give the user the option of reusing his existing stock of electrode holders irrespective of their make; that is to say without having to renew it or even modify it because that would prove prohibitively expensive for him; specifically, certain users have a considerable stock of electrode holders to which certain electrodes are permanently fixed and secured with a view to carrying out several machining operations on several different machines and over a lengthy period, that is to say one lasting several weeks or months. It would also be desirable for such an electrode management device to be capable of manipulating several if not all makes of EDM-specific electrode holder available on the market.

SUMMARY OF THE INVENTION

The object of the present invention is to realise the desires and avoid the disadvantages indicated hereinabove. The electrode management device for electrical discharge machining (EDM) machine tools is therefore characterized in that it comprises at least one first adapter piece associated with each of the exchangeable elements, the said first adapter piece being shaped so that it at least partially surrounds the electrode holder and so that it can be gripped at least partially around its periphery by a gripper that forms the said gripping member so as to ensure that the exchangeable element is held precisely by the gripper.

As a result, it becomes possible to manipulate and store EDM-specific electrode holders from any supplier. Such a solution has numerous advantages. There is no need to rethink the way in which electrode holders are grasped according to the standards widely adopted in the field of electrical discharge machining. In particular, it is possible to keep the simple and proven system developed around a narrow drawbar attached axially to the electrode holder and which on the one hand is used for locking the exchangeable element in the bore of the attachment system and on the other hand is used for storing it reliably in the magazine. As a result, the user's holding of equipment is not affected. The user is not obliged to remove an electrode that has already been installed and set up on its electrode holder. That also improves the image of the EDM process and gives it a more dynamic reputation in an environment of machines and programmable controllers that are becoming ever more rapid. The machine equipped with a similar electrode management device acquires better profitability without disadvantaging the other machines in the machine shop that draw upon the same pool of electrode holders.

Advantageously, this first adapter piece has a lateral size at least as great as that of the electrode holder. Such a configuration makes it possible to counter unwanted tiltings of the exchangeable element while it is being manipulated by the gripper. The risks of droppage are set aside. There is no risk of the drawbar being engaged askew in the attachment system on the machine, thus eliminating the risks of jamming and ensuring excellent precision with which the exchangeable element is repositioned on the machine.

The first adapter piece is shaped so that it can be imbricated on the electrode holder, fixing means being provided to secure it to the electrode holder in a particular way, yielding a highly advantageous method of use and characterized in that the first adapter piece is fixed rigidly to the drawbar while at the same time exhibiting a clearance with respect to all the parts of the electrode holder. Such a configuration allows a misalignment between the axes of the bar and of the electrode holder. Such misalignment is commonly achieved in the form of a toggle joint. Thus, any potential misalignment between the gripper and axis of symmetry of the attachment system of the machine will give rise to no parasitic loading as the drawbar is inserted.

Advantageously, the first adapter piece comprises a series of bores and of orifices that allow the drawbar, and the bosses and pins, to pass fully through it; this first adapter piece having, near the said bores and orifices, a thickness that does not exceed the height of the said bosses and pins. Further, it is equipped at its centre with a central bore designed to accept the drawbar and the central axis of this bore corresponds to the overall axis of symmetry of this first adapter piece. The latter advantageously comprises at least one peripheral groove or rib designed to collaborate with a rib or groove provided on the gripper in order to block any movement of the exchangeable element with respect to the gripper while it is being manipulated. Advantageously, it also comprises on its underside a recess intended to accept the electrode holder which becomes housed in the said recess. At the periphery of this first adapter piece there is at least one notch for angularly indexing the exchangeable element with respect to the gripper and/or with respect to the individual housings of the magazine.

In one particularly advantageous embodiment, the drawbar is incorporated into the first adapter piece to constitute a one-piece component.

In another highly advantageous complementary embodiment, the management device comprises a second adapter piece associated with and fixed to each of the individual housings of the magazine that are likely to be used; this second adapter piece comprises at its centre an axial bore designed to accept the drawbar of the electrode holder; each individual housing is secured to an arm articulated at its free end to the magazine so as to allow the individual housing and the exchangeable element to be tilted from a horizontal position into a vertical position and vice versa, so that the exchangeable elements can be stored horizontally but picked up by the gripper in a vertical position.

BRIEF DESCRIPTION OF THE DRAWINGS

Other advantageous features are contained in the dependent claims and in the detailed description which follows which is supported by a series of figures which schematically and by way of example depict the embodiments of the invention.

FIG. 7a is an exploded view of two items that are supposed to collaborate with one another: the chuck connected to the machining head and an exchangeable element equipped with its first adapter piece. In this example, the machine is equipped with electrode holders identical to that of FIG. 3a.

DETAILED DESCRIPTION

Figure 1:
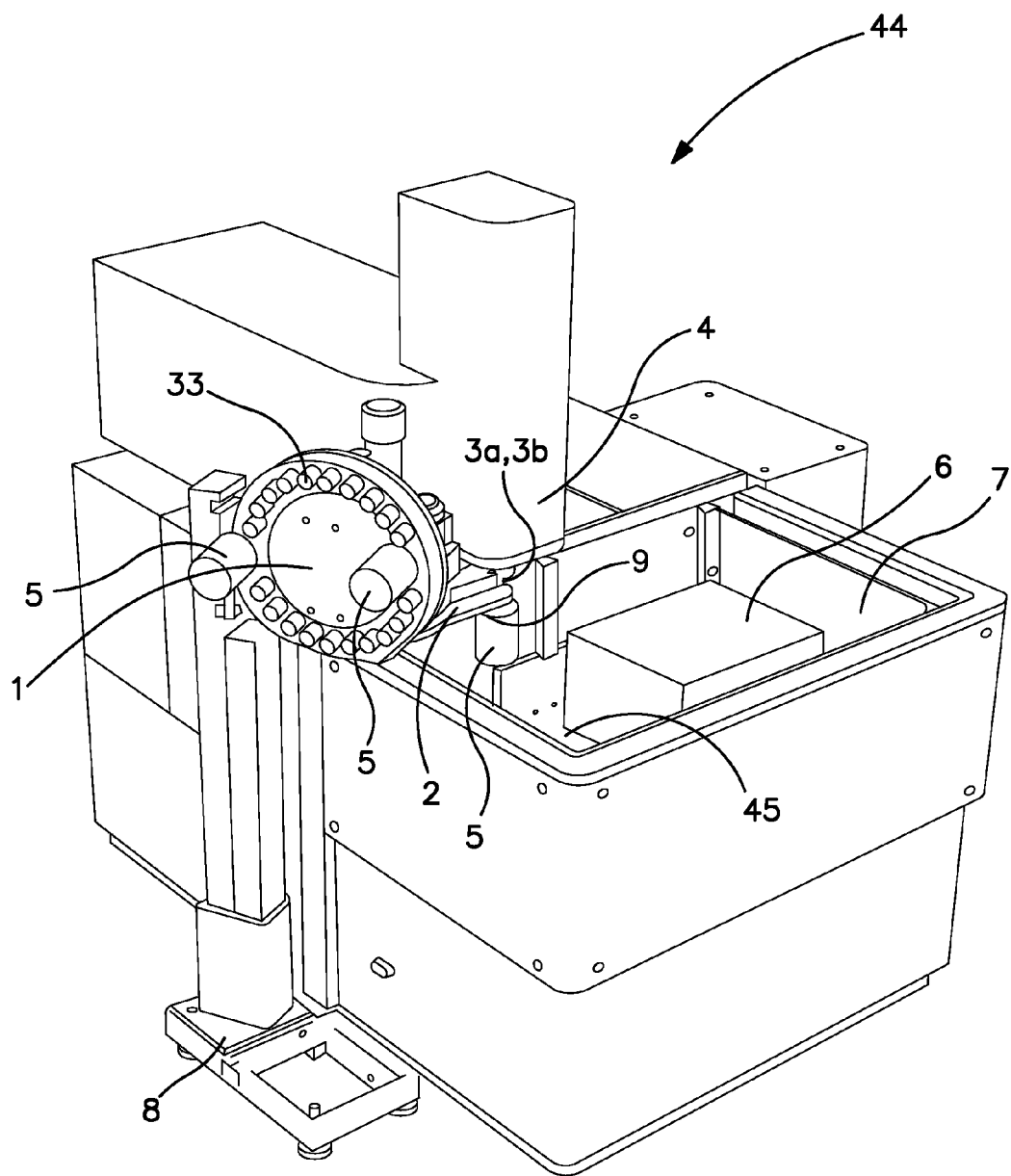
FIG. 1 depicts an electrical discharge machining (EDM) machine tool equipped with an electrode management device according to the invention.
Figure 2:
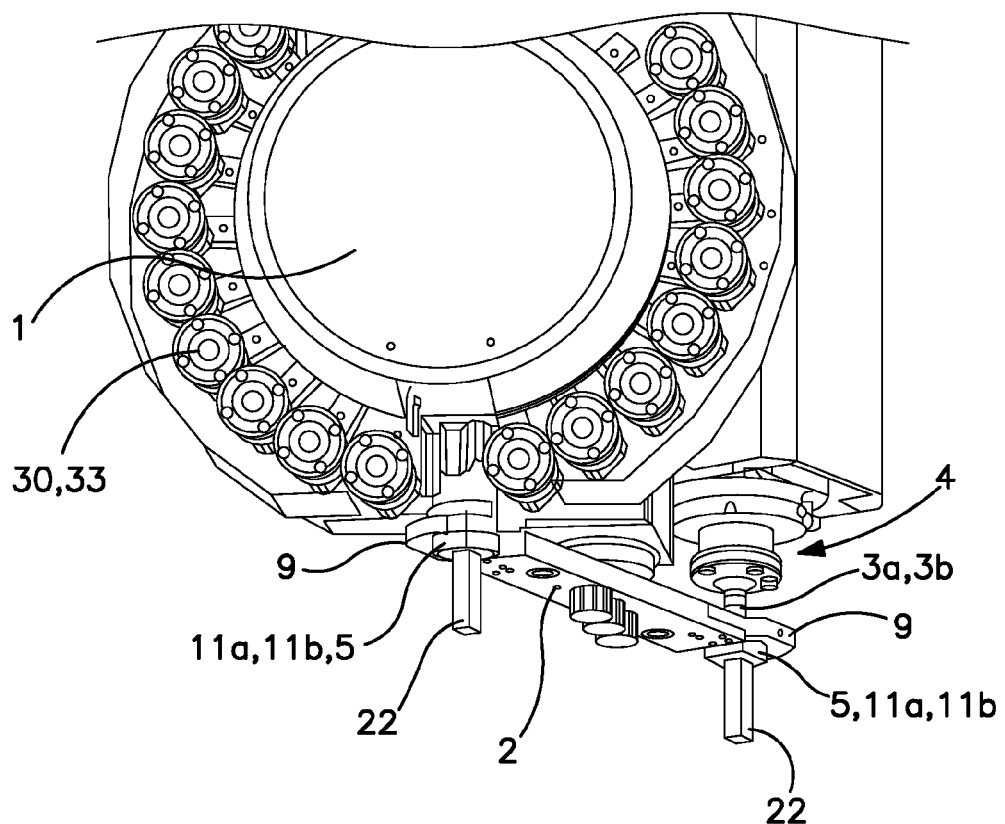
FIG. 2 depicts, in greater detail, the electrode management device with the magazine, the changer which manipulates two exchangeable elements and the machining head of the machine.

FIGS. 1 and 2 illustrate the working environment of the EDM machine 44 with the magazine 1 and the element changer 2 with which the machine is equipped. The arm of the changer 2 performs two rapid movements. A vertical first movement is intended, on the one hand, to lock/unlock the drawbar 3a, 3b in/from its inserted position on the magazine side, and on the other hand to introduce/remove this same drawbar into/from the chuck connected to the machining head 4 of the machine; the said chuck constituting an attachment system as mentioned hereinabove. A rotary second movement through 180° allows the position of the exchangeable element 5 which is leaving the machine head 4 and the position of the one leaving the magazine 1 to be switched over. A workpiece electrode 6 is attached to the work table 45 of the EDM machine 44. The magazine 1 rests on the floor on a stand 8 the footprint of which is relatively small by comparison with that of the machine 44 itself. This space saving is chiefly due to the fact that the circular magazine 1 revolves about a horizontal axis. Because of this special feature, the exchangeable element 5 leaving the magazine 1, in order to be grasped by gripper 9 of the changer, has to be tilted from the horizontal position into the vertical position. As illustrated in FIG. 2, the tilt occurs at the housing 33 of the magazine 1 situated nearer to the bottom. Likewise, the exchangeable element 5 brought back by the gripper 9 of the changer 2 and which is entering the magazine 1 has to be tilted from the vertical position into the horizontal position. This quarter-turn rotational movement of the exchangeable element 5 is brought about a conventional mechanical function of the magazine 1. As a result, the exchangeable elements 5 in this type of embodiment are not stored suspended by their drawbar 3a, 3b as they are in EDM standard racks or magazines. The changer 2 effects a small-amplitude vertical translational movement and a rotation through 180°. Through these optimized movements it is possible, in a very short space of time, to remove an exchangeable element 5 that is locked in the chuck of the machining head 4, replace it with a new element and return the old one to the magazine 1. Numerical control of the EDM machine 44 plays a part only in positioning the machining head 4 at the tool change point. The movements of the changer are governed by cams and end-of-travel sensors according to techniques known by those skilled in the art, which means that the device produced is reliable and inexpensive.

Figure 3A:
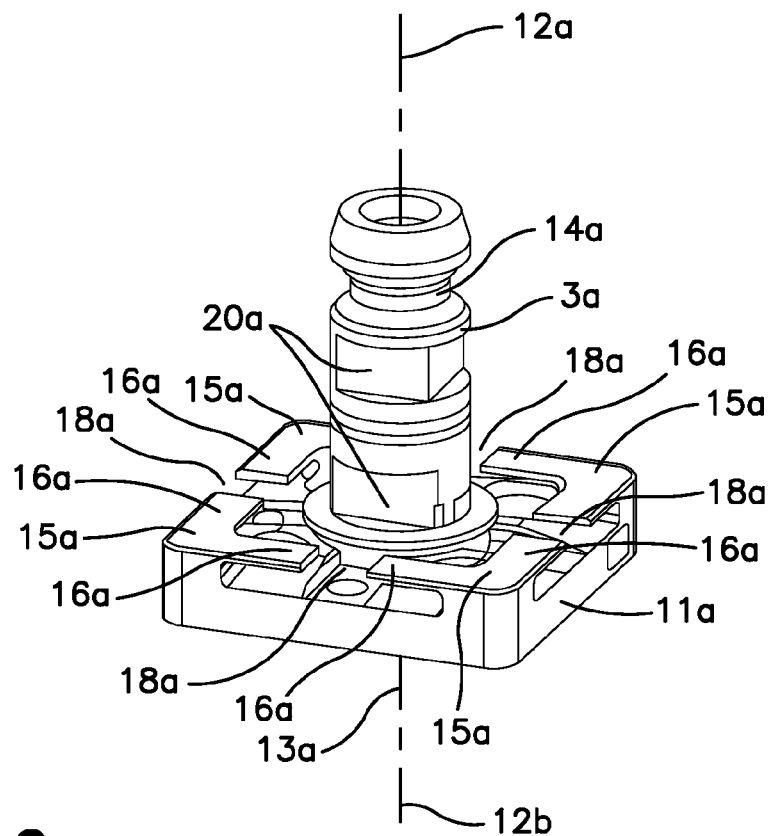
FIGS. 3a and 3b illustrate two types of EDM standard electrode holders from two different suppliers.
Figure 3B:
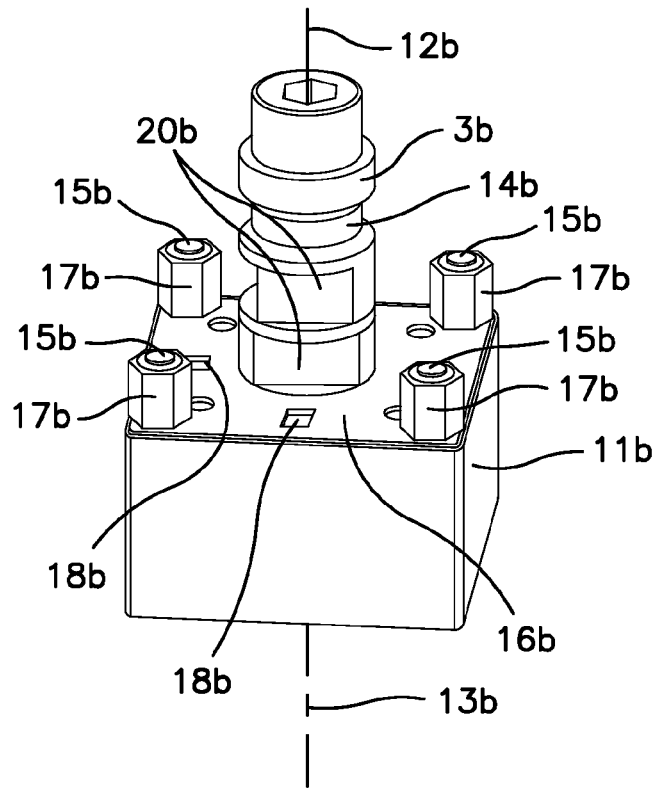

FIGS. 3a and 3b recall some of the specific features of two types of EDM standard electrode holder offered by two reputable suppliers: SYSTEM 3R and EROWA. The narrow drawbar 3a, 3b is attached axially to the electrode holder 11a, 11b. To simplify the figures, the device forming the connection between the bar and the electrode holder and that allows misalignment between the axes 12a, 12b of the bar and 13a, 13b of the electrode holder has not been illustrated because it is well known to those involved. Near the end of the drawbar 3a, 3b there is a circular groove 14a, 14b intended to collaborate with the locking system situated in the chuck of the machine head 4. On the electrode holders 11a, 11b, the reference plane of contact is achieved by four surface-ground bearing faces 15a, 15b. In the case of FIG. 3b, the four bearing faces 15b are situated on protruding bosses 17b attached to the electrode holder 11b. Plates 16a, 16b which are elastic in one direction but which offer great rigidity in the perpendicular direction, are attached to the electrode holder 11a, 11b. Pyramid-shaped pins 19a, 19b made of a very hard material situated on the machining head 4a, 4b and visible in FIG. 7a, 7b become positioned in inset features 18a, 18b provided in the elastic plates 16a, 16b. The narrow drawbar 3a, 3b in its middle part comprises two superposed grooves 20a, 20b corresponding to the two types of fork already mentioned: the changer fork and the magazine forks (which forks have not been depicted in the figures).

Figure 4A:
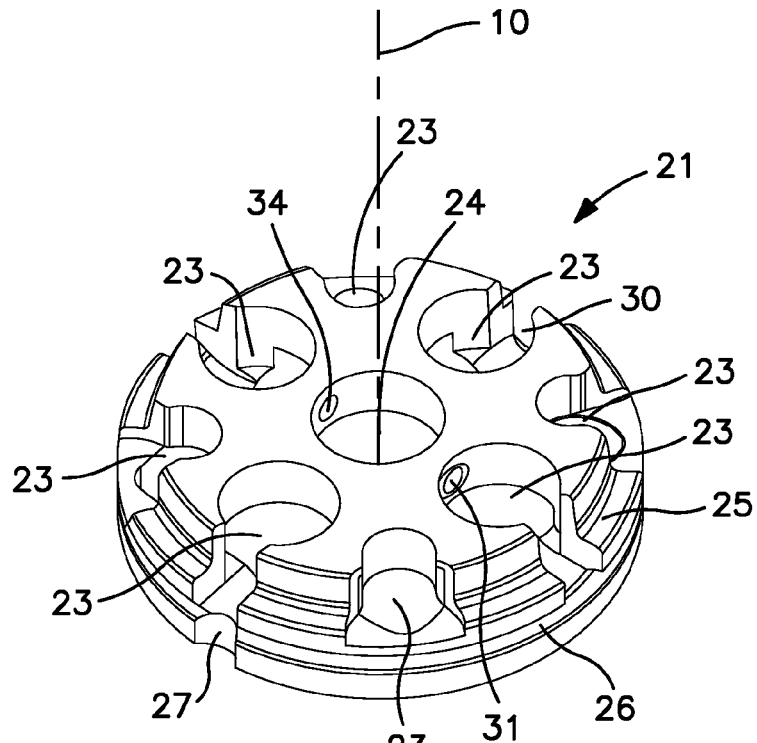
FIGS. 4a and 4b depict the first adapter piece according to the invention, these being, respectively, a view of its top face and of its underside.
Figure 4B:
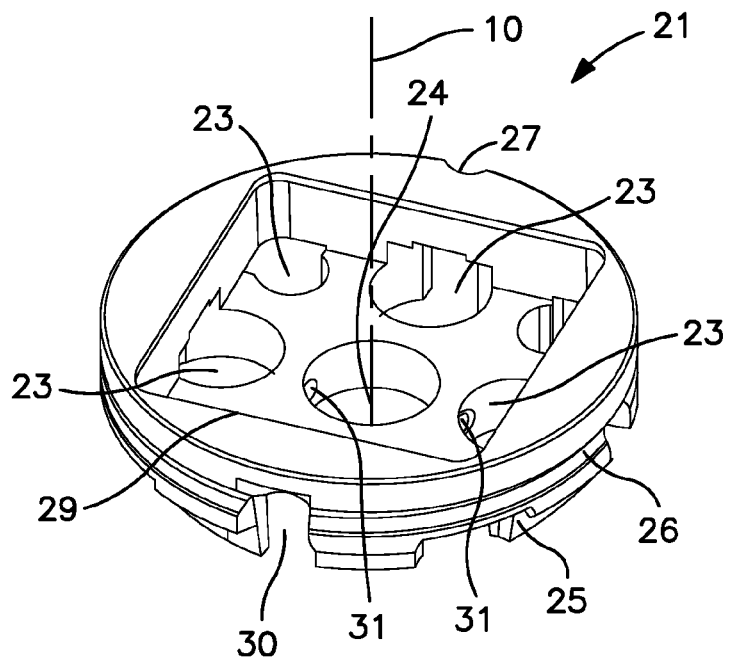

A first adapter piece 21 (FIGS. 4a and 4b) has been designed to allow the gripper 9 of the changer 2 (FIG. 6) to grasp an EDM-specific exchangeable element 5; the latter comprising an electrode holder 11a and an electrode 22. Such a changer gripper 9 is designed to grip an object preferably of cylindrical shape and to achieve a firm grip. The object grasped will be grasped all the more rigidly and reliably the larger the gripper. It is therefore preferable for the object 5 that is to be handled to be grasped around a diameter which encompasses its size; the inside diameter of the changer gripper 9 is chosen to be large enough to suit the size of all electrode holders 11a, 11b to be handled. As a result, according to the invention, the first adapter piece 21, intended to act as an interface between the changer gripper 9 and the exchangeable elements 5, achieves a lateral size at least as great as that of the EDM standard electrode holder 11a, 11b. It is overall in the shape of a flattened cylinder and comprises a series of orifices 23 and a central bore 24 allowing the protruding elements 17a, 17b, 19a, 19b, 3a, 3b attached either to the machining head or to the electrode holder to pass through the adapter piece 21, and this allows the latter to be introduced into the upper part of the electrode holder 11a, 11b as may be seen in FIGS. 5a and 5b. The bore 24 at the centre of the $1^{st}$ adapter piece 21 is designed to fix the drawbar 3a, 3b. The latter is a locking and transport member but does not play a direct part in positioning the electrode holder, as explained above. The axis of symmetry 10 of the central bore 24 corresponds to the overall axis of symmetry of the said adapter piece 21. Of the orifices 23 already mentioned, four are made at the periphery of the central bore 24 to allow the bosses 17a, 17b supporting the bearing faces to pass freely through. Four other orifices are situated on an intermediate diameter, between the drawbar 3a, 3b and the bearing faces, in order to allow the four pyramid-shaped pins 19a, 19b attached to the machining head 4a, 4b to pass freely through. A wide circular chamfer 25 made at its upper part advantageously allows this $1^{st}$ adapter piece 21 to be set into a housing of the magazine and thus fix the exchangeable element 5 while it is in storage.

Figure 5A:
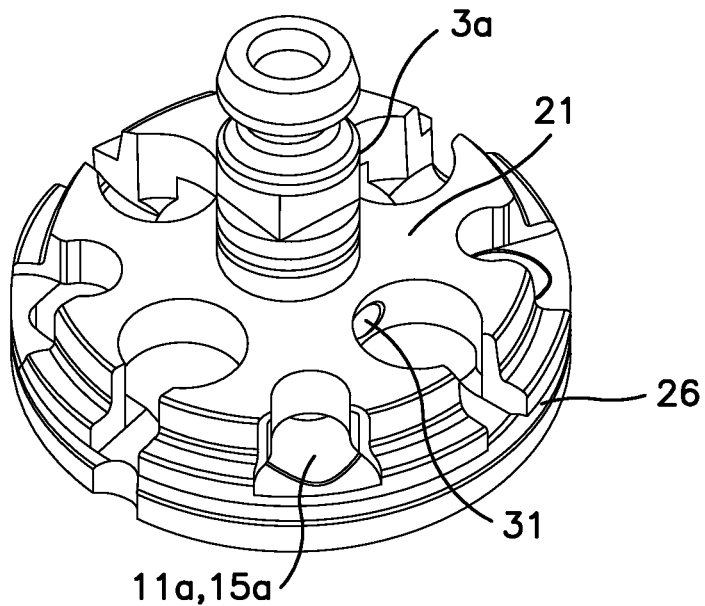
FIGS. 5a and 5b depict the same first adapter piece mounted on the two types of EDM standard electrode holder as can be seen in FIGS. 3a and 3b.
Figure 5B:
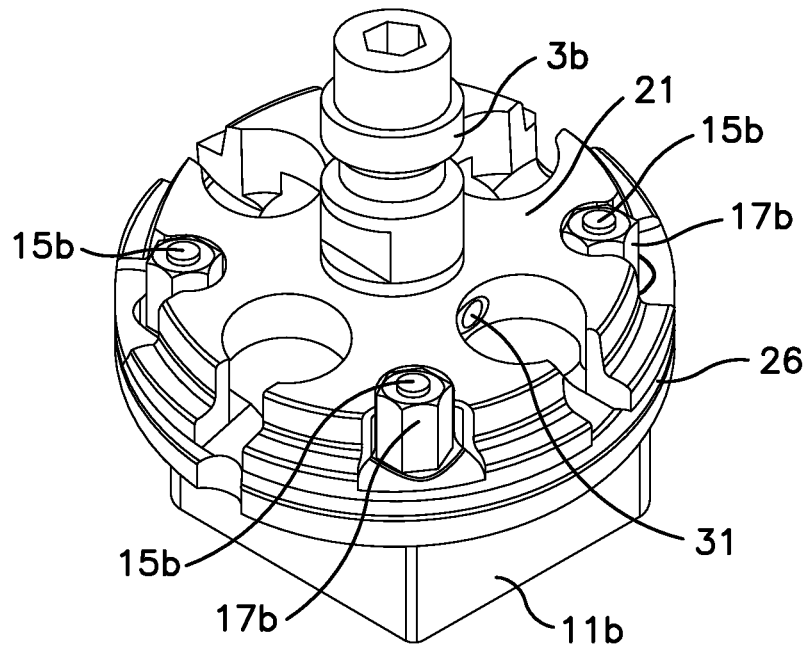
Figure 6:
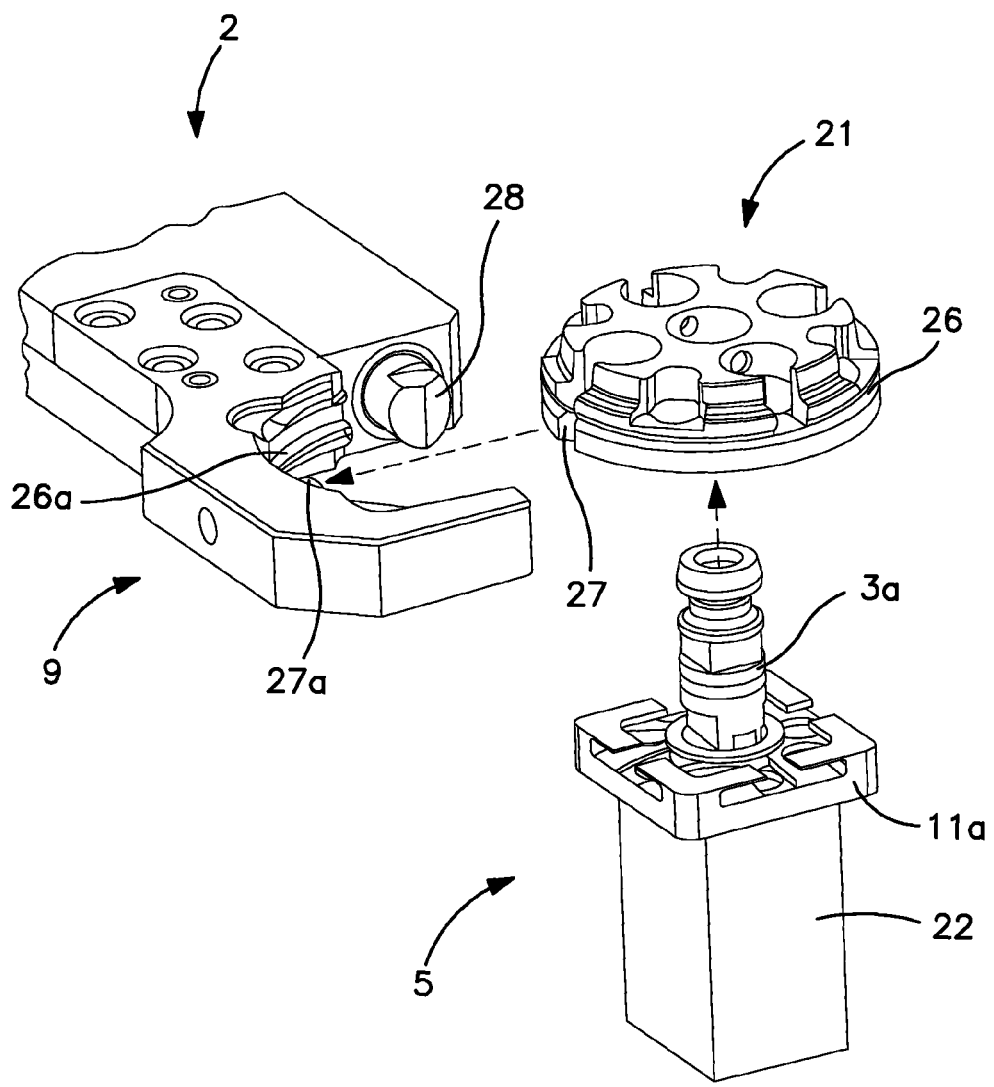
FIG. 6 is an exploded view of three items that are supposed to collaborate with one another: the gripper of the changer, the first adapter piece and an exchangeable element.

A circular groove 26 is machined at the periphery, in which groove a corresponding semicircular rib 26a belonging to the changer gripper 9 will become housed. A $1^{st}$ notch 27 intended to collaborate with a peg 27a of the gripper 9 provides angular indexing during handling by the arm of the changer 2. To block any movement of the exchangeable element 5 while it is being handled, a locking finger 28 (FIG. 6) on the gripper 9 comes into abutment against the adapter piece 21. The latter further comprises on its lower part a recess 29 (FIG. 4b, 7a, 7b) of square shape and intended to accept the electrode holder 11a, 11b which is set into the said recess. FIGS. 5a and 5b show the first adapter piece 21 mounted on the upper part of two electrode holders from two different suppliers 11a, 11b. The electrodes have not been depicted in these two figures. It may be seen that, thanks to this adapter piece 21, the changer gripper 9 can grip in the circular groove 26 around a diameter which encompasses the entire size of the electrode holder 11a, 11b. This gripper device, in this example, therefore consists of the groove 26 into which the rib 26a of the gripper 9 is inserted, the notch 27 into which the peg 27a is inserted, and the locking finger 28 of the gripper 9. It constitutes a system that is particularly stable and that allows the exchangeable element 5 equipped with its adapter piece 21 to be held firmly in the gripper 9 during the rapid rotational movements of the changer 2. It should be noted that the angular indexing of the adapter piece 21 in the magazine 1 is performed by a $2^{nd}$ notch 30 diametrically opposite the $1^{st}$ notch 27 used for angular indexing in the gripper 9.

Figure 7A:
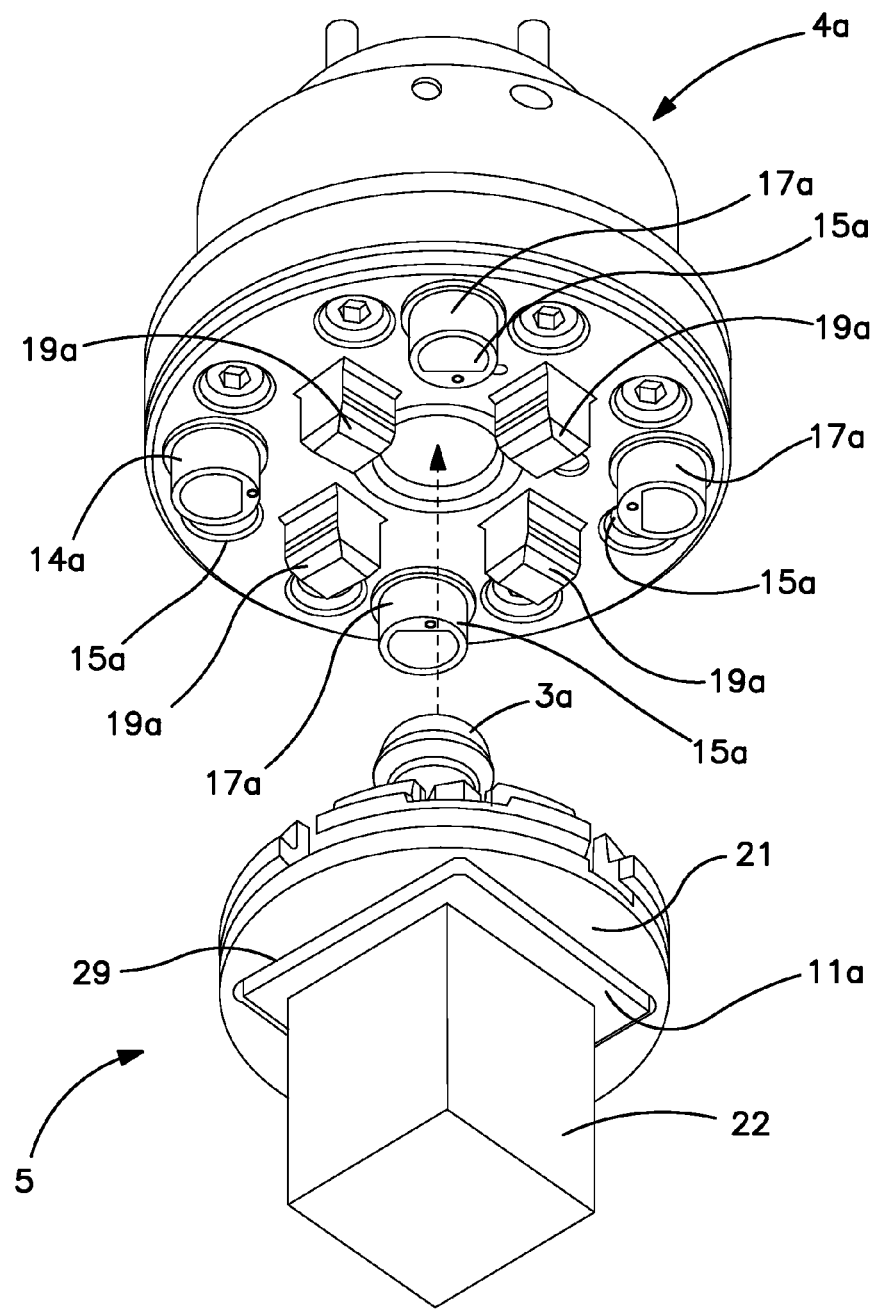
Figure 7B:
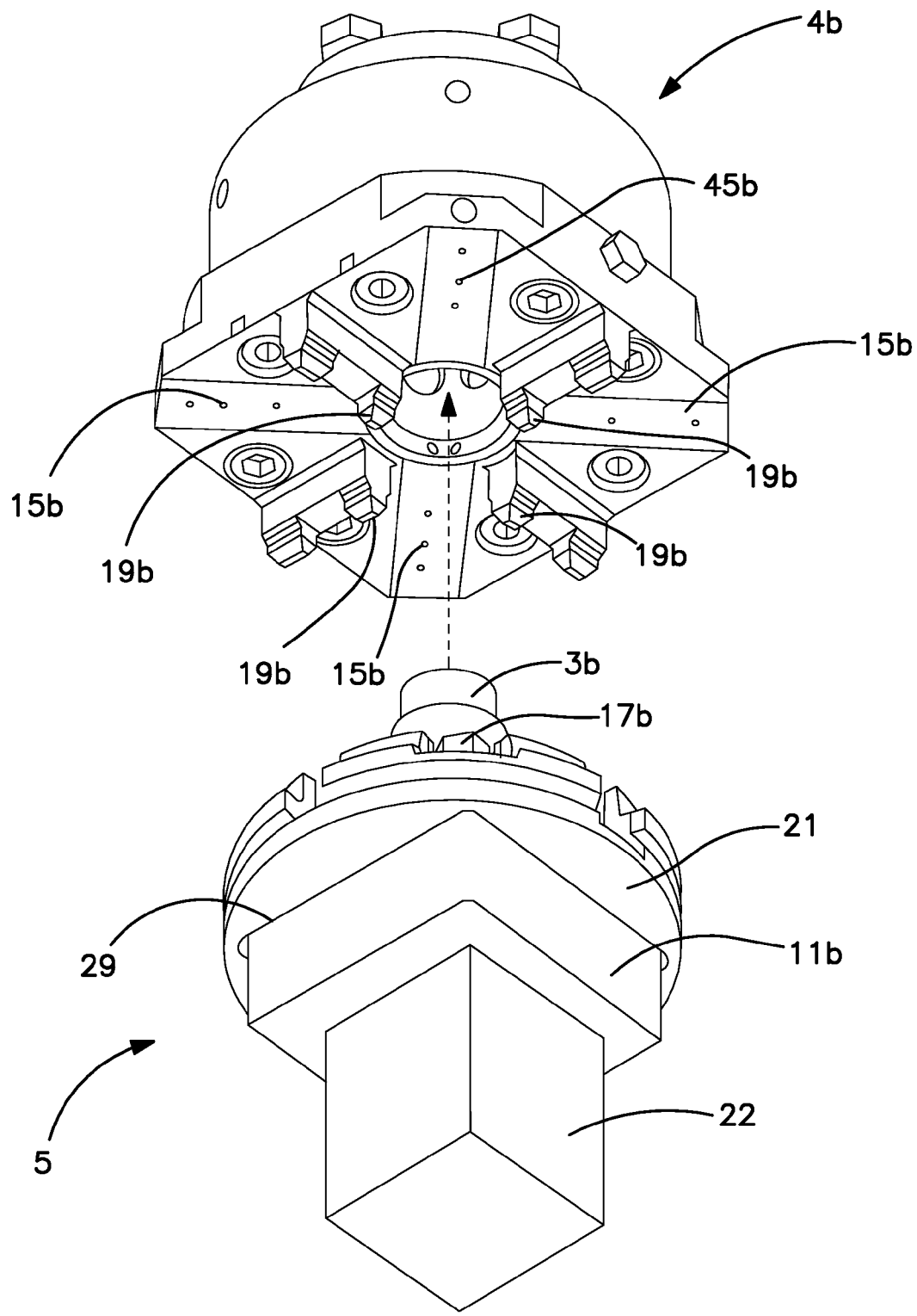
FIG. 7b is similar to the previous figure except that the machine is equipped with electrode holders identical to that of FIG. 3b.

Near the orifices 23 through which the bosses 17a, 17b pass, the thickness of this first adapter piece 21 must not exceed the height of the said bosses, but may if need be extend in the direction of the electrode 22. FIG. 7a shows an electrode holder 11a of a certain make, equipped with its adapter piece 21 and with its electrode 22, opposite a chuck of the same make mounted in the machining head 4a of the EDM machine. FIG. 7b, which is similar, illustrates a scenario in which the machine is equipped with another make of EDM standard hardware.

For the electrode holder 11a, 11b to be once again capable of unlimited manipulation by an EDM changer and magazine not benefiting from the invention, all that is required is the removal of this $1^{st}$ adapter piece 21 which can be removed and refitted very simply using at least one small binding screw 31 or a clip engaging with the drawbar 3a, 3b. In this way the $1^{st}$ adapter piece 21 is rigidly secured to the drawbar 3a, 3b, but has a clearance with respect to all the parts of the electrode holder 11a, 11b so that it does not prevent misalignment between the axis 12a, 12b of the bar 3a, 3b and the axis of the electrode holder 13a, 13b as described hereinabove.

This first adapter piece 21 accompanies each electrode holder 11a, 11b or exchangeable element 5 present in the magazine 1. The electrodes 22 are secured very precisely to the EDM standard electrode holder 11a, 11b. The adapter piece 21 does not disturb this securing and operates in a similar way to the drawbar 3a, 3b which likewise, in certain embodiments, can be fitted/removed with ease. According to an alternative form of the invention, it is conceivable for such an adapter piece to be designed as a one-piece component by incorporating a drawbar into it.

This first adapter piece 21 can be designed to fit just one make of EDM-specific electrode holder, but it is also possible to imagine adapter pieces that accept electrode holders of several different makes.

Because in this type of embodiment the electrode holders 11a, 11b or exchangeable elements 5 are not stored suspended by their drawbar 3a, 3b as already mentioned hereinabove, it is necessary to design a second adapter piece 32 so that they can be stored horizontally as shown in FIGS. 1 and 2. This second adapter piece 32 provides the interface between the electrode holder 11a, 11b equipped with the first adapter piece 21, and the housing 33 of the magazine 1.

In a less advantageous embodiment in which the magazine stores the exchangeable elements in a vertical position, it is quite clearly possible once again to use the drawbar 3a, 3b as a suspension member; in which case the said second adapter piece 32 is not needed.

Figure 8A:
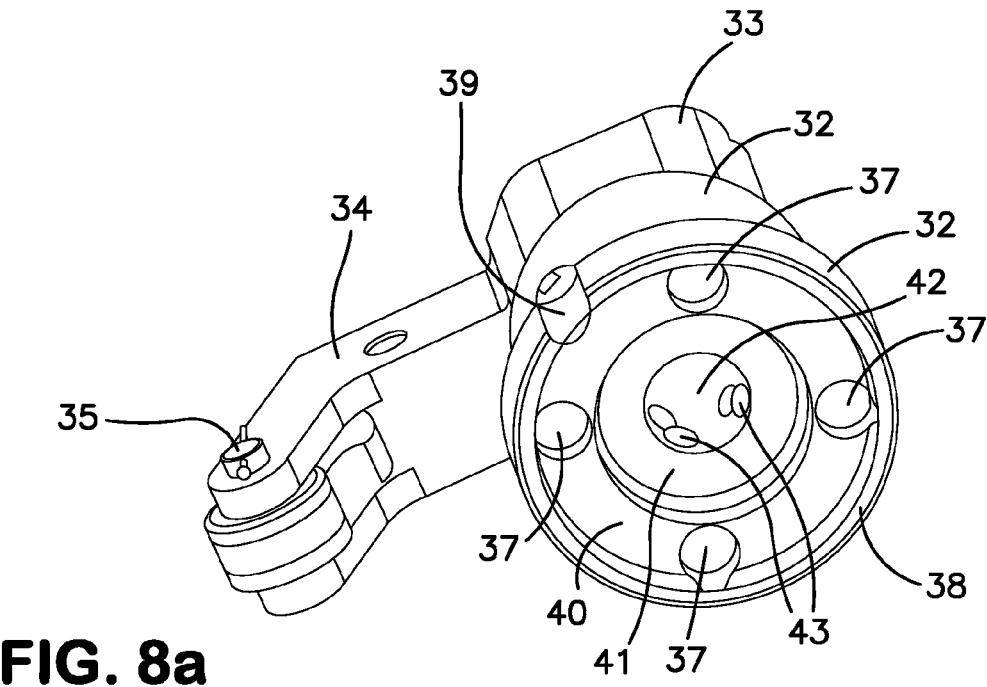
FIGS. 8a and 8b are two different views of the second adapter piece according to the invention, mounted on the one housing of the magazine.
Figure 8B:
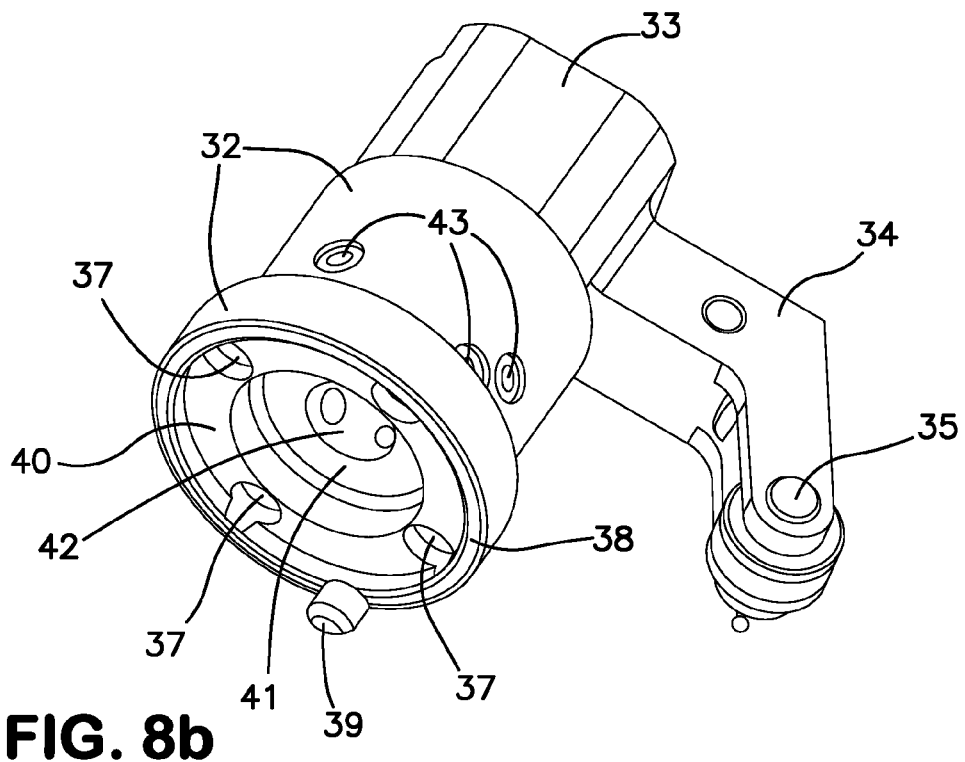
Figure 9:
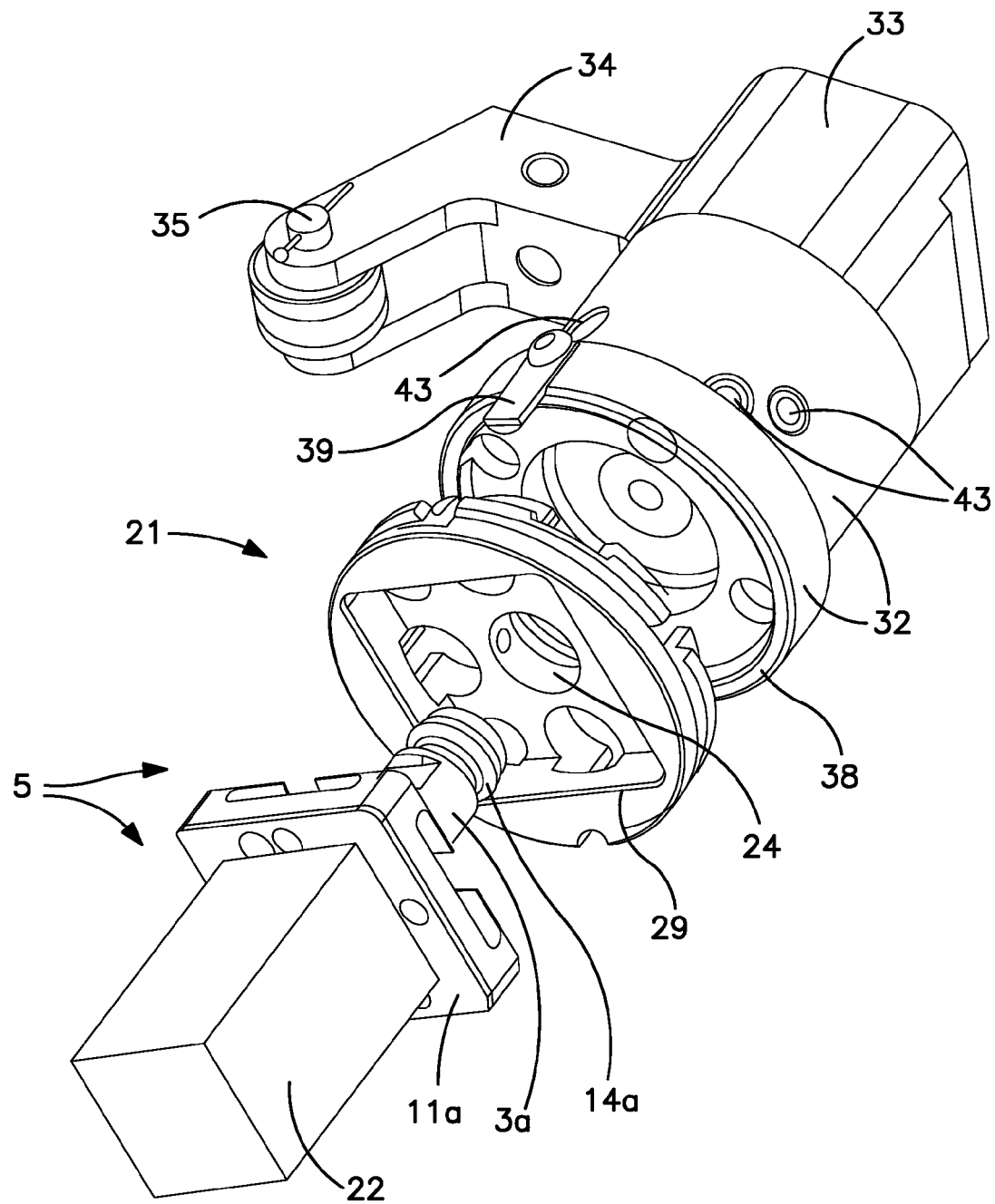
FIG. 9 is an exploded view of three items that are supposed to collaborate with one another: an exchangeable element, the first adapter piece associated with it, but which has been depicted separately, and a housing of the magazine on which the second adapter piece is mounted.

As FIGS. 8a, 8b and 9 show, each housing 33 of the magazine 1 is equipped with an arm 34 at the end of which a pivot pin 35, perpendicular to the axis of symmetry of the housing 33, allows the exchangeable element 5 to be tilted from the horizontal position into the vertical position and vice versa. With a view to storing and locking EDM standard electrode holders 11a, 11b in a horizontal position, it is necessary for the said second adapter piece 32 to be designed as described below.

This second adapter piece 32 is associated with each individual housing 33 of the magazine 1 that is to accept an exchangeable element 5, to which it is fixed in the conventional way for example by means of a threaded rod. In another embodiment, the second adapter piece 32 and the housing of the magazine 33 constitute a one-piece component.

Advantageously, the second adapter piece 32 may be equipped at its periphery with a collar 38 the inside diameter of which corresponds to the outside diameter of the first adapter piece 21 so that the latter can be set into the second adapter piece 32 with clearance. An angular indexing peg 39 is provided projecting from this same collar 38. The peg 39 is intended to be set into the corresponding $2^{nd}$ notch 30 of the first adapter piece 21 when the operator installs the exchangeable elements 5 in the magazine 1. The collar 38 delimits a first chamber 40 into which the upper part of the first adapter piece 21 is set as shown in FIG. 9. Four cutouts 37 are possibly provided in the closed end of the chamber 40 to accept the bosses of 17b. A second chamber 41, which is narrower and deeper than the first 40, if need be of conical shape, leaves a space to guide the drawbar 3a, 3b as it is introduced into an axial bore 42 made at the centre of the second adapter piece 32. Clearance is provided between the bore 42 and the drawbar 3a, 3b. The function of locking the exchangeable element 5 into its individual housing 33, via the drawbar 3a, 3b, is performed in the conventional way by a system of balls and springs 43 which collaborate with the upper groove 14a, 14b of the drawbar 3a, 3b. The locking/unlocking operation is a simple mechanical operation which takes place with no remote control. It is merely necessary for the springs to be carefully calibrated in order to achieve a good compromise between firm locking of the exchangeable element in the storage position and the ease of introduction/extraction by the arm of the changer. This second adapter piece 32 does not require tight manufacturing tolerances as the electrode holders do. It can be manufactured from a light material such as plastic, hence at modest cost.

Of course the embodiments and variants described hereinabove are entirely nonlimiting and can be modified in any desirable way within the scope defined by the independent claim.

In particular, the first adapter piece 21 could be arranged around the electrode holder 11a, 11b rather than connected to the drawbar 3a, 3b.

This first adapter piece 21 could also fit between the electrode holder 11a, 11b and the electrode 22. That would entail accepting a not insignificant disadvantage; that of dismantling each electrode from its electrode holder in order to introduce the first adapter piece.

In these variants that are less advantageous it would also be necessary to accept the effects arising notably out of a misalignment between the attachment system of the machine and the gripper of the changer, which gripper would be able, via the electrode holder, to transmit parasitic loads liable to disrupt the operation of the positioning members, such as bearing faces, pins, elastic pieces, as the exchangeable element 5 was introduced into the attachment system of the EDM machine.

The electrode management device could have a construction different from that depicted in the figures. For example, a second magazine with a vertical carousel could be installed in front of the machine and at a lower level than the machining tank 7 with a view to exchanging elements exclusively with the table 45 of the machine while a first magazine served only the head 4 of the same machine. In such an instance, it would be the uppermost housing of the magazine that would need to tilt from the horizontal position to the vertical position in order to serve the element 5 to the gripper 9. In this case, the exchangeable element 5 would be grasped by the gripper 9 with its drawbar 3a, 3b pointing downwards. Such an arrangement is clearly not ideal for exchanging elements weighing in excess of ten kilos or so.

In another example, a magazine with a horizontal carousel could comprise several changers in order to serve several machines. It would be possible for the rack or magazine not to be equipped with the second adapter piece 32; that is to say that the exchangeable elements 5 would be suspended therein via their drawbar 3a, 3b, while one machine at least would be equipped with a high-speed changer capable of grasping the exchangeable elements via the first adapter piece 21.

The second adapter piece 32 could be constructed differently; for example, it could have no collar 38 at its periphery into which to set the first adapter piece 21; the latter being positioned in the rack only via its drawbar 3a, 3b and the peg 39.

REFERENCES USED IN THE FIGURES

1 Magazine
2 Element changer
3a, 3b Drawbar
4, 4a, 4b Machining head
5 Exchangeable element
6 Workpiece electrode
7 Machining tank
8 Magazine stand
9 Changer gripper
10 Axis of symmetry of $1^{st}$ adapter piece
11a, 11b Electrode holder
12a, 12b Bar axes
13a, 13b Electrode holder axes
14a, 14b Circular groove
15a, 15b Surface-ground bearing faces
16a, 16b Elastic plates or pieces
17a, 17b Bosses
18a, 18b Insets in elastic plates
19a, 19b Pyramid-shaped pins
20a, 20b Grooves in drawbar
21 $1^{st}$ adapter piece
22 Tool electrode
23 Orifices in $1^{st}$ adapter piece
24 Central bore in $1^{st}$ adapter piece
25 Chamfer around $1^{st}$ adapter piece
26 Groove around $1^{st}$ adapter piece
26a Rib in changer gripper 9
27 $1^{st}$ notch in $1^{st}$ adapter piece
27a Peg in changer gripper 9
28 Locking finger on gripper
29 Recess on lower part of $1^{st}$ adapter piece
30 $2^{nd}$ notch in $1^{st}$ adapter piece
31 $1^{st}$ adapter piece binding screw
32 $2^{nd}$ adapter piece 33 Magazine housings
34 Magazine housing arm
35 Arm pivot pin
37 Cutouts to accommodate bosses 17b
38 Collar on 2$^{nd}$ adapter piece
39 Indexing peg on 2$^{nd}$ adapter piece
40 1$^{st}$ chamber in 2$^{nd}$ adapter piece
41 2$^{nd}$ chamber in 2$^{nd}$ adapter piece
42 Axial bore in 2$^{nd}$ adapter piece
43 Locking system in 2$^{nd}$ adapter piece
44 EDM machine
45 Machine table

The invention claimed is:

1. Device for managing the electrodes for electrical discharge machining machine tools using tool electrodes intended to machine workpiece electrodes, the management device comprising at least one magazine that has a series of individual housings adapted to accept and hold exchangeable elements consisting of the said electrodes each mounted on an electrode holder, and at least one changer device equipped with at least one gripping member intended to move the exchangeable elements from the said individual housings towards an attachment system situated on the machine and vice versa, characterized in that the management device comprises at least one first adapter piece associated with each of the exchangeable elements, the said first adapter piece being shaped so that the first adapter piece at least partially surrounds the electrode holder and so that the first adapter piece can be gripped at least partially around a periphery of the first adapter piece by a gripper and an associated locking element that forms the said gripping member so as to ensure that the exchangeable element is held precisely by the gripper.

2. Management device according to claim 1, wherein the said electrode holder is adapted to support electrodes acting as tools or as workpieces, the said electrode holder being fitted with a drawbar connected axially to the said electrode holder and intended to lock the exchangeable element in the attachment system of the machine, the drawbar for this purpose comprising, near a free end, at least one retaining element intended to collaborate with a locking device of the said attachment system, the electrode holder being fitted on a first face, firstly with elastic pieces which collaborate with alignment elements advantageously produced in the form of pins provided on the attachment system and secondly with bearing faces arranged around the drawbar and constituting a plane of reference, the said bearing faces collaborating with corresponding bearing elements provided on the attachment system so as to ensure exact positioning of the electrode holder with respect to the attachment system.

3. Management device according to claim 1, wherein the first adapter piece has a lateral size at least as great as that of the electrode holder.

4. Management device according to claim 2, wherein the first adapter piece is shaped so that the first adapter piece is imbricated on the electrode holder, fixing means being provided to secure the first adapter piece to the drawbar or to the electrode holder.

5. Management device according to claim 4, wherein the first adapter piece is fixed rigidly to the drawbar while at the same time exhibiting a clearance with respect to all the parts of the electrode holder so as to allow a misalignment between the axes of the bar and of the electrode holder, the said misalignment being achieved in the form of a toggle joint.

6. Management device according to claim 4, wherein the first adapter piece comprises a central bore and orifices which allow the drawbar, and bosses supporting the bearing surfaces or elements, and the pins that form the alignment elements, to pass fully through the adapter piece.

7. Management device according to claim 6, wherein the first adapter piece has, near the said bore and the said orifices, a thickness that does not exceed the height of the said bosses and alignment elements.

8. Management device according to claim 4, wherein the first adapter piece is equipped at a centre of the first adapter piece with a bore to accept the drawbar, the central axis of this bore corresponding to the overall axis of symmetry of the said first adapter piece.

9. Management device according to claim 1, wherein the first adapter piece comprises at least one peripheral groove or rib to collaborate with a rib or groove provided on the gripper in order to block any movement of the exchangeable element with respect to the gripper while the exchangeable element is being manipulated.

10. Management device according to claim 4, wherein the first adapter piece comprises a recess intended to accept the electrode holder which becomes housed in the said recess.

11. Management device according to claim 1, wherein the first adapter piece comprises at a periphery of the first adapter piece at least one notch intended to angularly index the exchangeable element with respect to at least one of the gripper and the said individual housings of the magazine.

12. Management device according to claim 2, wherein the drawbar, intended to fix the exchangeable element to the attachment system of the machine, is incorporated into the first adapter piece to constitute a one-piece component.

13. Management device according to claim 2, further comprising a second adapter piece associated with and fixed to each of the individual housings of the magazine that are likely to be used, this second adapter piece comprising at a centre of the first adapter piece an axial bore adapted to accept a drawbar of the electrode holder, each individual housing being secured to an arm articulated at a free end to the magazine so as to allow the individual housing and the exchangeable element to be tilted from a horizontal position into a vertical position and vice versa, so that the exchangeable elements can be stored horizontally and picked up by the gripper in a vertical position.

14. Management device according to claim 13, further comprising angular indexing means and a notch, which are provided between the first and the second adapter pieces to ensure a predetermined angular position of the exchangeable element when the exchangeable element is stored in the magazine.

15. Management device according to claim 13, wherein the second adapter piece comprises at a periphery of the first adapter piece a collar the inside diameter of which corresponds to the outside diameter of the first adapter piece so that this first adapter piece can be set with clearance into the second adapter piece.

16. Management device according to claim 15, wherein the collar delimits in the second adapter piece a chamber into which part of the first adapter piece can be set, with clearance.

17. Management device according to claim 13, wherein one of the second adapter piece and the individual housing is equipped with a second locking device intended to collaborate with the drawbar.

18. Management device according to claim 17, wherein the second adapter piece comprises a chamber of conical shape situated around the axial bore so as to guide the drawbar as the drawbar is introduced into the said bore.

19. Management device according to claim 13, wherein the second adapter piece and the individual housing of the magazine with which the second adapter piece is associated constitute a one-piece component.

20. Management device according to claim 13, wherein the second adapter piece is made of a plastic material.

21. Management device according to claim 13, wherein the magazine is of circular overall shape revolving about a horizontal axis.

\* \* \* \* \*